LELAND & RUSCO.
Slaughtering Elevator.
No. 85,109. Patented Dec. 22, 1868.
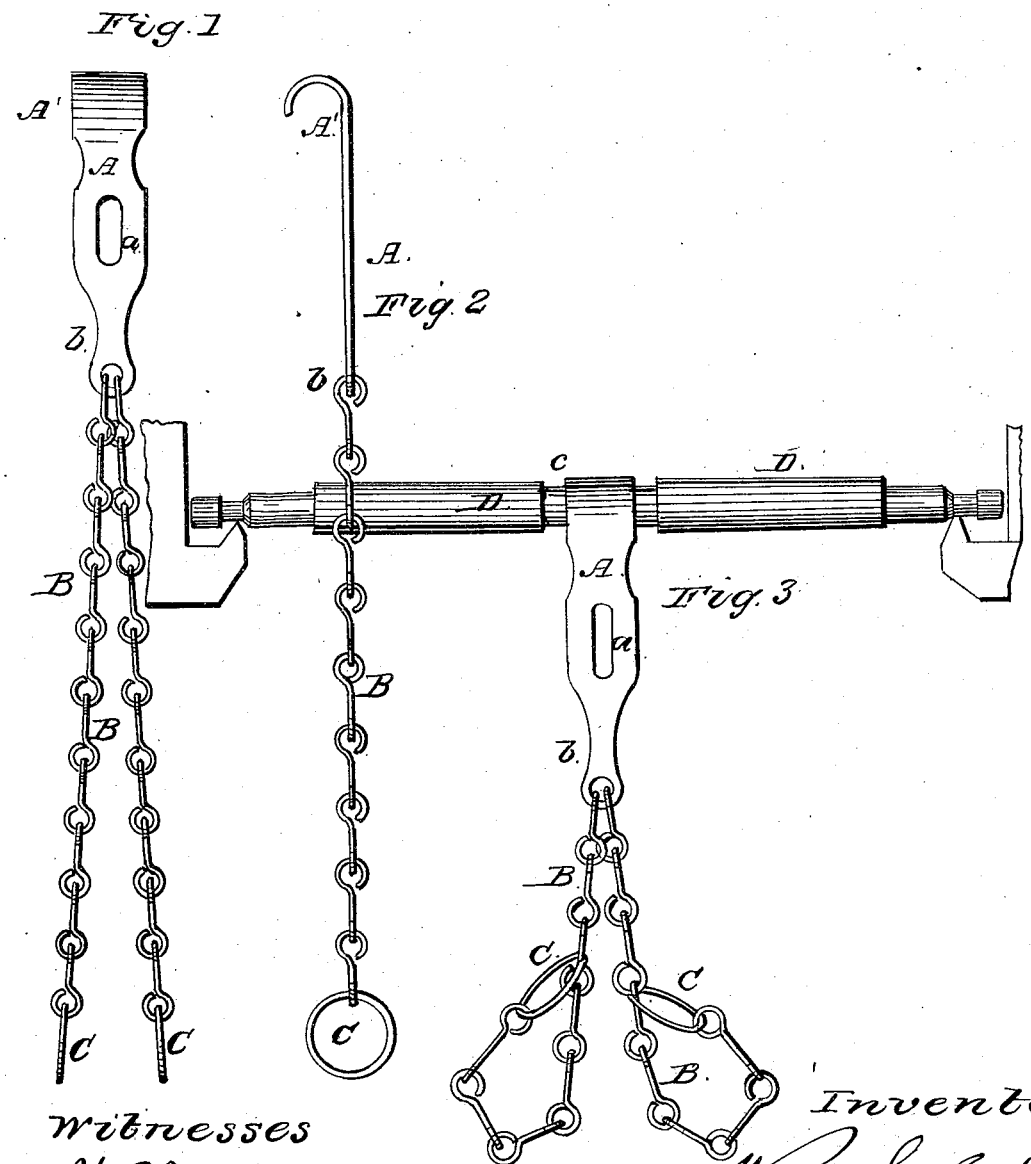

United States Patent Office.

WINDSOR LELAND AND VOLNEY E. RUSCO, OF CHICAGO, ILLINOIS.

Letters Patent No. 85,109, dated December 22, 1868.

IMPROVEMENT IN DEVICE FOR SUSPENDING SLAUGHTERED ANIMALS.

The Schedule referred to in these Letters Patent and making part of the same.

*To all whom it may concern:*

Be it known that we, WINDSOR LELAND and VOLNEY E. RUSCO, of Chicago, in the county of Cook, and State of Illinois, have invented a new and useful Device for Suspending Slaughtered Animals; and we do hereby declare and make known that the following is a full, clear, and exact description of the same, reference being had to the accompanying drawings, and the letters and figures marked thereon, which form part of this specification.

Our said invention consists in a novel device for use in slaughter-houses, to suspend slaughtered and dressed hogs and other animals, when they have become frozen, and require to be hung up and steamed; but said device may, if thought desirable, be used to suspend live hogs, to be slaughtered by sticking them in such positions, in order that the flesh may be thoroughly drained of the blood.

To enable those skilled in the art to understand how to construct and use our said invention, we will proceed to describe the same with particularity, making reference, in so doing, to the aforesaid drawings, in which—

Figure 1 represents a front view, and

Figure 2, a side view of our device; and

Figure 3 represents the said device as when in use and suspended from a gambrel or other suitable support.

Similar letters of reference in the several figures denote the same parts of our invention.

A represents a flat bar of iron or other suitable metal, its upper end being curved over flatwise, as indicated in the drawings, forming a hook, marked A', which is hooked over a gambrel, D, when in use, as represented in fig. 3.

At the lower end of said bar A, a hole, b, is formed, into which one or two chains, B, are fastened, said chains being provided at their lower ends with suitable rings, C, as shown.

At about the centre of said flat bar A, a hole, marked a, is formed, into which the hoisting-tackle is hooked, when it is desired to raise the implement to hook or hang it upon the gambrel or other suitable support.

In using our invention, one or both of the chains B are folded, and the fold is dropped or passed through the rings C, as shown in fig. 3, when one or both of said folds are passed over one or both of the legs of the animal, so that, upon drawing up the said device by means of the hoisting-tackle, the loops of the chains are drawn tight around the animal's leg, so as to hold it firmly and suspend the animal as desired.

In suspending slaughtered or dressed hogs, when frozen, the chain or chains may be applied to either the fore or hind legs; but, in using the device for suspending the animal while being slaughtered, the device should be applied upon one or both of the hind legs.

When the device has been secured to the legs of the animal, as described, the hoisting-tackle is hooked into the hole a, and the device and animal are raised or hoisted up, and the hook A' suspended upon its desired and appropriate support, as indicated in the drawings, when dressed animals are being treated, or upon an inclined bar or rod, when live animals are being suspended.

Having described the nature, construction, and operation of our invention, we will now specify what we claim, and desire to secure by Letters Patent.

We claim the suspending-bar A, when constructed and operated substantially as and for the purposes herein specified.

WINDSOR LELAND.
VOLNEY E. RUSCO.

Witnesses:
W. E. MARRS,
J. L. COBURN.